United States Patent [19]

McGuire

[11] Patent Number: 5,051,543

[45] Date of Patent: Sep. 24, 1991

[54] SLOTTED GROUNDING FERRULE

[75] Inventor: David E. McGuire, Yorkhaven, Pa.

[73] Assignee: E. I. Du Pont de Nemours and Company, Wilmington, Del.

[21] Appl. No.: 411,358

[22] Filed: Sep. 22, 1989

[51] Int. Cl.[5] .................... H02G 15/08

[52] U.S. Cl. .................... 174/78; 16/108; 29/517; 29/518; 29/862; 29/871; 174/84 C; 174/90; 403/278; 439/98; 439/877; 439/882

[58] Field of Search .................... 174/78, 84 C, 90, 94 R; 16/108, 109; 29/862, 871, 516, 517, 518; 439/98, 877, 882; 403/278, 281

[56] References Cited

U.S. PATENT DOCUMENTS

| | | | |
|---|---|---|---|
| 2,013,217 | 9/1935 | Olmstead | 174/84 C X |
| 2,450,529 | 10/1948 | Sprigg | 29/517 |
| 3,015,685 | 1/1962 | Gerlach et al. | 174/90 |
| 3,200,190 | 8/1965 | Forney | 174/75 C |
| 3,280,246 | 10/1966 | Lawson et al. | 174/78 |
| 3,314,044 | 4/1967 | Powell | 29/517 |
| 3,322,885 | 5/1967 | May et al. | 174/78 |
| 3,348,192 | 10/1967 | DeVito | 439/853 |
| 3,465,092 | 9/1969 | Schwartz | 174/78 |
| 3,517,375 | 6/1970 | Mancini | 439/585 |
| 3,539,965 | 11/1970 | Morehart et al. | 439/75 |
| 3,546,365 | 12/1970 | Collier | 174/78 |
| 3,626,363 | 12/1971 | McIver et al. | 439/880 |
| 3,761,872 | 9/1973 | Ebinger | 174/84 C X |
| 3,763,460 | 10/1973 | Hatschek et al. | 439/277 |
| 3,897,127 | 7/1975 | Haitmanek | 174/78 X |
| 4,193,665 | 3/1980 | Arnold | 350/96.22 |
| 4,416,501 | 11/1983 | Fusselman et al. | 439/396 |
| 4,880,396 | 11/1989 | Lipari | 439/578 |

FOREIGN PATENT DOCUMENTS

| | | | |
|---|---|---|---|
| 666667 | 2/1952 | United Kingdom | 174/90 |
| 1288757 | 9/1973 | United Kingdom | . |

*Primary Examiner*—Morris H. Nimmo

[57] ABSTRACT

A grounding ferrule is characterized by a generally cylindrical hollow member having at least three equiangularly circumferentially spaced axially extending slots which cooperate to define a plurality of circumferentially adjacent webs. Each web has a plurality of radially inwardly extending protrusions provided on the inner surface thereof. The ferrule responds to a radially inwardly directed crimping force applied circumferentially to the exterior surface of the webs by deflecting radially inwardly to define a constricted central region.

1 Claim, 3 Drawing Sheets

SLOTTED GROUNDING FERRULE

BACKGROUND OF THE INVENTION

1. Field of the Invention

This invention relates to a ferrule useful for electrically interconnecting the braided shields on each one of a individual braided cables which are, in turn, arranged in a master cable.

2. Description of the Prior Art

With reference to the stylized prespective representation of FIG. 1, shown is a typical known master cable, generally indicated by the reference character 10, having an external insulating jacket 12. A portion of the jacket 12 is cut away, as at 14, to reveal an array of individual braided cables 18. The braided cables are shown as being spirally wrapped, although it should be understood that the individual braided cables 18 may be otherwise arranged within the master cable 10. Although FIG. 1 illustrates five cables 18, it should be understood that any predetermined number of individual braided cables 18 may be disposed within the cable 10. In typical usage, the individual braided cables 18A through 18E fan from an open end 20 of the jacket 12.

Each of the individual braided cables 18 is illustrated as containing a predetermined plurality of individually jacketed multiple conductor strands, indicated by the reference character 22. It should be understood, however, that other forms of conductors may be disposed with a given braided cable 18. For example, an individual braided cable may alternatively contain a single conductor (either solid or stranded) or coaxial conductors. Whatever the form of conductor, each braided cable 18 includes a braided metallic shield 24 that is diposed about the conductor(s) thereof. The exterior of the master cable 10 is covered by an outer insulating jacket 28. As seen in FIG. 1 a predetermined axial length of each of the jackets 28 of each of the individual braided cables 18 is removed, thereby exposing the braided metallic shield 24 therein.

Cables such as that shown in FIG. 1 are typically utilized in connection with mainframe computer apparatus. It is the common practice to ground the braided shield 24 of each of the individual braided cables 18 by interconnecting the braid 24 to the chassis of the mainframe with which it is associated. The grounding of the braids 24 must be accomplished mechanically since heating or welding may melt the insulation used in each of the cables.

Accordingly, in the typical instance, grounding of the braid 24 of each braided cable 18 is accomplished by individually laying each braided cable 18 in the master cable 10 into a housing of a device known as a grounding rook. The rook, so named because of its exterior resemblance to the correspondingly named chess piece, has enlarged ends and a central barrel portion. Electrical contact between the rook and the braid 24 is effected by radially inwardly directed bosses on the interior of the rook. The barrel portion of the rook is received within appropriately sized slots provided for that purpose in the chassis of the mainframe of other end user device. In this manner, the braid 24 of each of the cables 18 in the master cable 10 may be connected to the chassis.

The foregoing manner of grounding each of the braids 24 is believed to disadvantageous in that it is time consuming and expensive. An individual rook is used for each individual braided cable. It is believed advantageous to provide an arrangement whereby the braided shields 24 of each of the individual braided cables 18 carried within the jacket 12 of the master cable 10 can be chassis grounded simultaneously, thereby avoiding the necessity of individually grounding the braids 24 of each of the individual cables 18.

SUMMARY OF THE INVENTION

The present invention relates to a grounding ferrule for use in interconnecting the braided shield of each of the plurality of individual braided cables disposed within a master cable. The ferrule is a hollow tubular member formed of a crimpable conductive material such as brass or copper. A plurality comprising at least three plurality axially extending slots are provided through the tubular member generally intermediate the axial ends thereof. The slots cooperate to define circumferentially adjacent webs therebetween. The inner surface of each web has at least one, but preferably a plurality, of inwardly directed protrusions disposed thereon.

In use, the braided shield of each of the individual braided cables is exposed. Each of the braided cables is threaded into the ferrule and the ferrule slid therealong until it overlays the aligned and axially overlapped exposed braids. The ferrule is then subjected to a radially inwardly directed crimping force acting substantially along the entire circumference of the ferrule in a region generally axially centrally of the webs. The crimping force compresses the webs radially inwardly thereby reducing the diameter of the ferrule. This action results in placing the braid of each of the braided cables and the ferrule in common electrical contact. Thereafter, if desired, the ferrule may be introduced into a rook so that each of the multi-stranded conductors may be simultaneously chassis grounded. Alternatively, a selected one of the braids of the individual braided cables may be grounded at a distant location, thereby grounding all of the braided cables.

BRIEF DESCRIPTION OF THE DRAWINGS

The invention will be more fully understood from the following detailed description thereof taken in connection with the accompanying drawings which form a part of this application and in which.

DETAILED DESCRIPTION OF THE INVENTION

Figure 1:
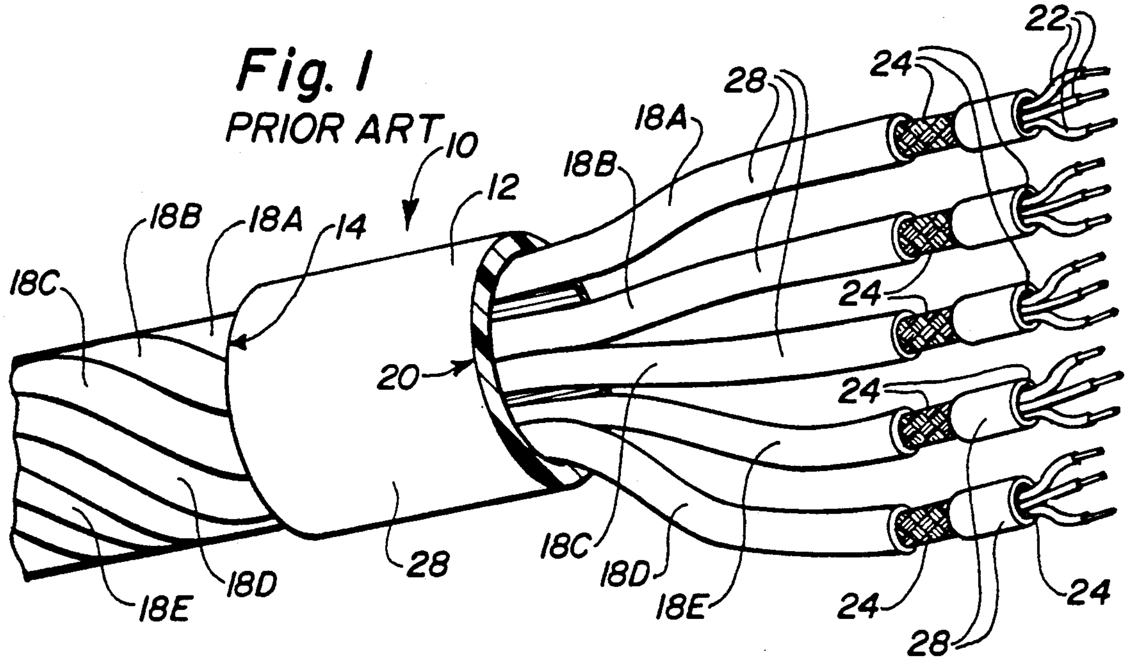
Fig. 1 PRIOR ART
FIG. 1 is a stylized perspective view of a master cable having a plurality of individual braided cables therein, in which each braided cable carries a predetermined plurality of individually jacketed strands collectively surrounded by a braided metallic shield, with a portion of the jacket of each braided cable being removed to expose the braided shield thereof.

Throughout the following detailed description similar reference numerals refer to similar elements in all figures of the drawings.

Figure 2:
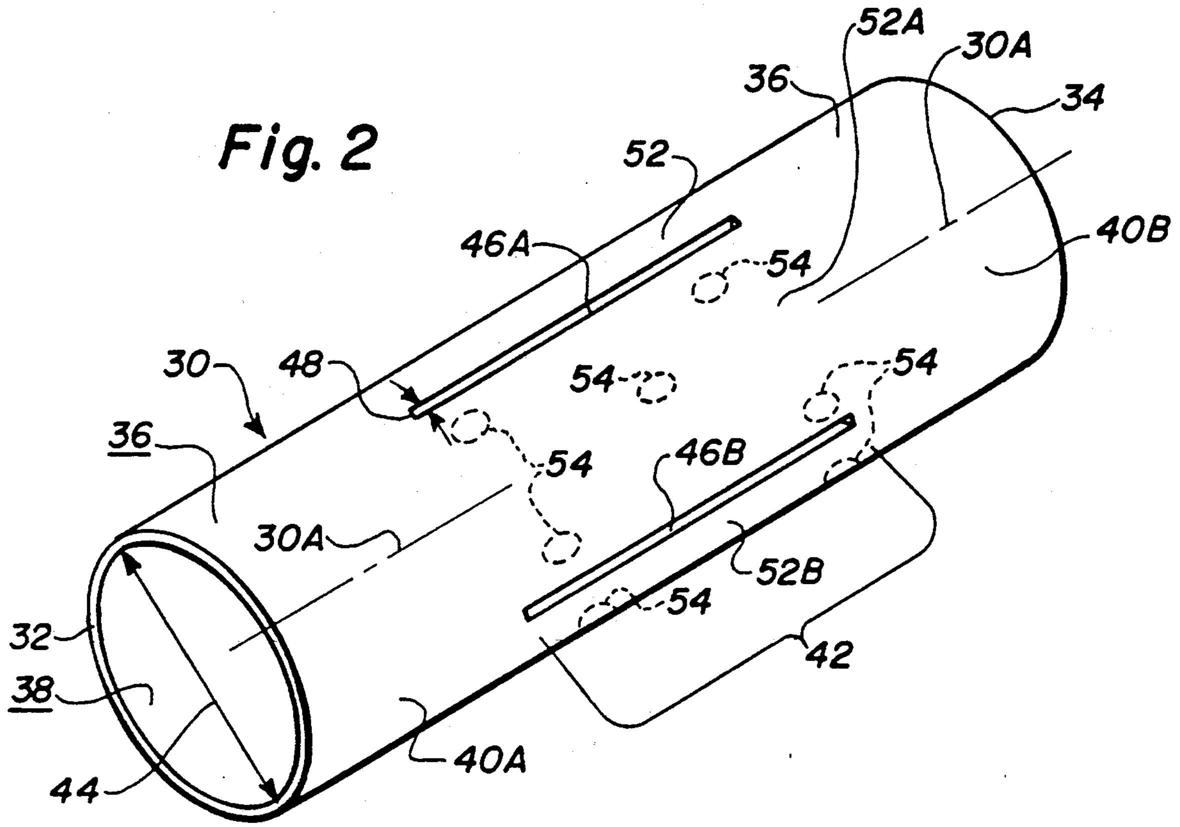
FIG. 2 is a perspective view of a grounding ferrule in accordance with the present invention.

With reference to FIG. 2 shown is a perspective view of a grounding ferrule 30 in accordance with the present invention. The use of a grounding ferrule 30 permits the metallic braids 24 of each of the individual braided cables 18 within the master cable 10 to be simultaneously connected and grounded in common, thereby saving time and material.

The ferrule 30 is a generally cylindrical, hollow member having a first axial end 32 and a second axial end 34 thereon. The ferrule 30 is fabricated of any crimpable conductive material, preferably a metal such as brass or copper. The metal may be plated, as with tin plating, if desired. The ferrule 30 has an outer surface 36 and an inner surface 38. The regions 40A and 40B of the ferrule 30 adjacent to the axial ends 32 and 34, respectively, define collar portions which axially bracket a central region 42. The diametrical dimension 44 of the collars 40 defines the basic dimension of the ferrule 30 in the uncrimped state (FIG. 2).

In accordance with the present invention the central region 42 of the ferrule 30 is interrupted by at least three equiangularly spaced, generally axially extending slots 46A, 46B and 46C. In FIG. 2, only two of the slots are illustrated. The slots 46 each have a predetermined circumferential dimension 48 associated therewith and each slot 46 extends a predetermined axial distance in the central region 42 of the ferrule 30. The limit on the number of slots 46 provided in the ferrule is dependent upon the diameter of the cable 10. The slots 46 are preferably arranged to be axially coextensive along the ferrule 30 and lie generally parallel to the central axis 30A passing through the bore therof. It should be noted, however, that such an arrangement of the slots need not necessarily required so long as the desired response of the ferrule 30 (to be described) to a radially imposed crimping force is obtained.

The generally axially extending slots 46A, 46B and 46C cooperate to define three circumferentially adjacent webs 52A, 52B and 52C. On the interior surface 38 of each of the webs 52 there is provided at least one, but preferably a plurality, of radially inwardly extending protrusions 54.

The ferrule 30 may be fabricated from an appropriate length of tubing by machining the same or punching the same over a mandrel to define the desired number of slots 46 having the desired circumferential dimension 48. The protrusions 54 may be formed by a stamping operation, performed simultaneously with or apart from the formation of the slots.

In use, the ferrule 30 is threaded onto each of the individual braided cables 18 so that the exposed portions of the braids 24 thereof are axially overlapped by the central region 42 of the ferrule 30. A radially inwardly directed crimping force is imposed about the circumference of the exterior surface 36 of the central region 42 of the ferrule 30. The crimping force causes the webs 52 to deform radially inwardly.

Figure 3:
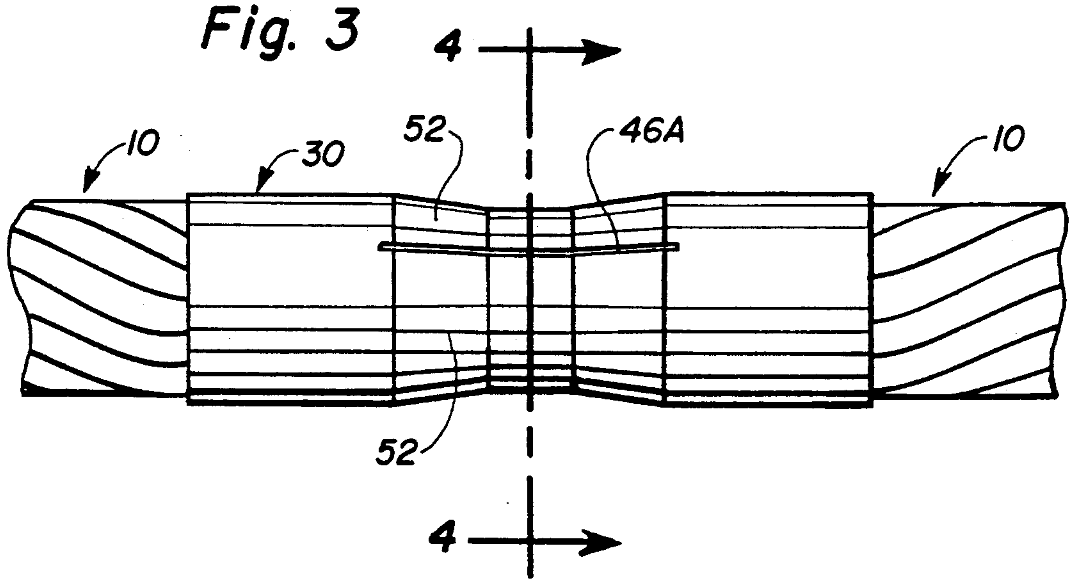
FIG. 3 is a sides elevational view of the grounding shield in accordance with the present invention after having been crimped.
Figure 4:
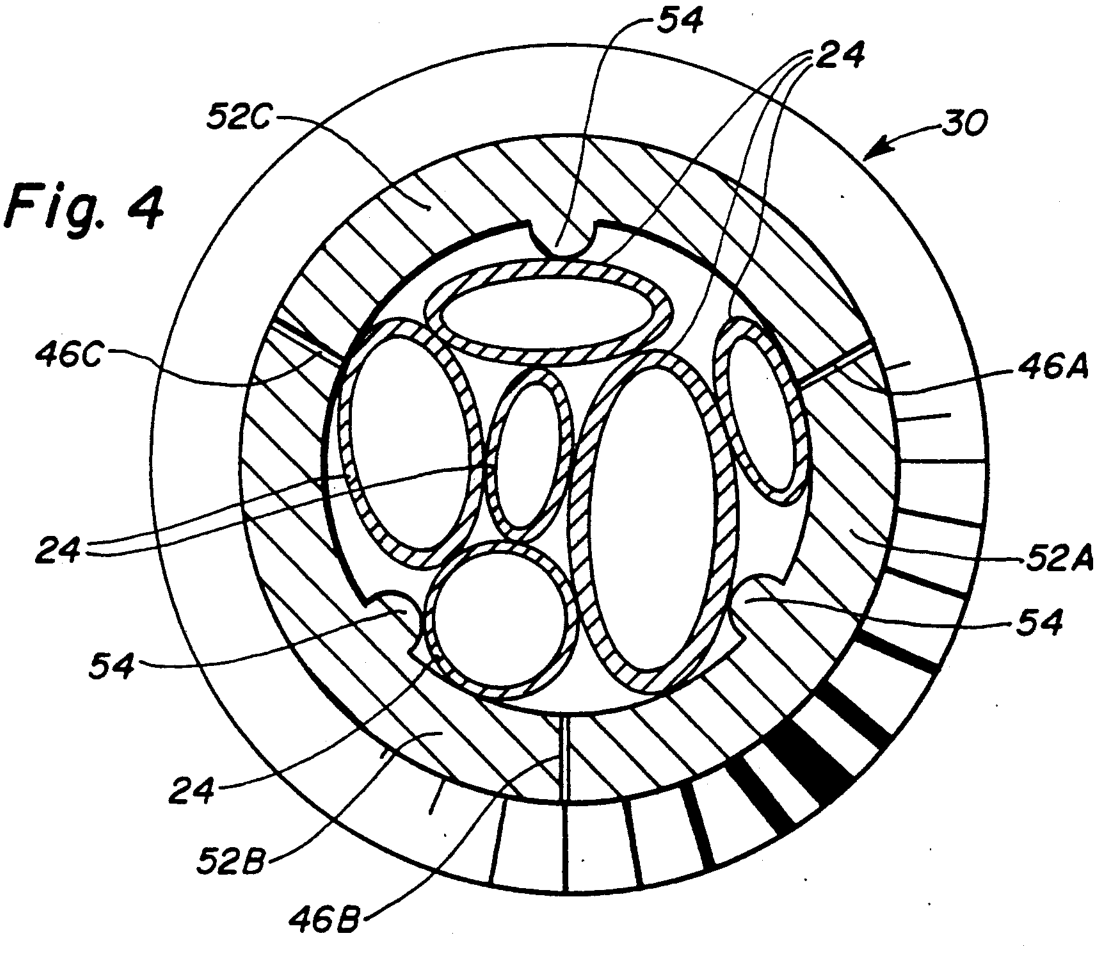
FIG. 4 is a sectional view taken along section lines 4—4 in FIG. 3 illustrating a stylized representation of a typical resulting arrangement of the braids of the individual braided cables after the ferrule has been crimped whereby the braided metallic shield of each of the cables is directly or indirectly interconnected to the grounding ferrule.

As may be appreciated from FIGS. 3 and 4 crimping force compresses the material of the webs 52 radially inwardly, constriction the diameter of the ferrule 30 in the central region 42 thereof, pressing together the braided shields 24. In this manner each of the braided shields 24 is electrically interconnected either directly or through the material of another shield to the conductive material forming the ferrule 30. The presence of the inward protrusions 54 on the inner surface 38 of the webs 52 facilitates and enhances the electrical interconnection. By judiciously selection of the circumferential dimension 48 of the slots 46 with respect to the basic dimension 44 of the ferrule 30 the webs, once constricted, approximate a generally cylindrical form, as is best seen in FIG. 4. Moreover, the provision of the slots 46 and the webs 52 defined thereby avoids bulging of the ferrule 30 under compression. AT least three slots are believed required in order to prevent the largest dimension of the compressed central portion of the ferrule from exceeding the basic dimension 44 of the ferrule 30 in its uncrimped state. It should be understood from the stylized representation of FIG. 4 that most, but not necessarily all, of the braids 24 of the cables 18 within the master cable 10 are deformed by the crimping action.

Figure 5:
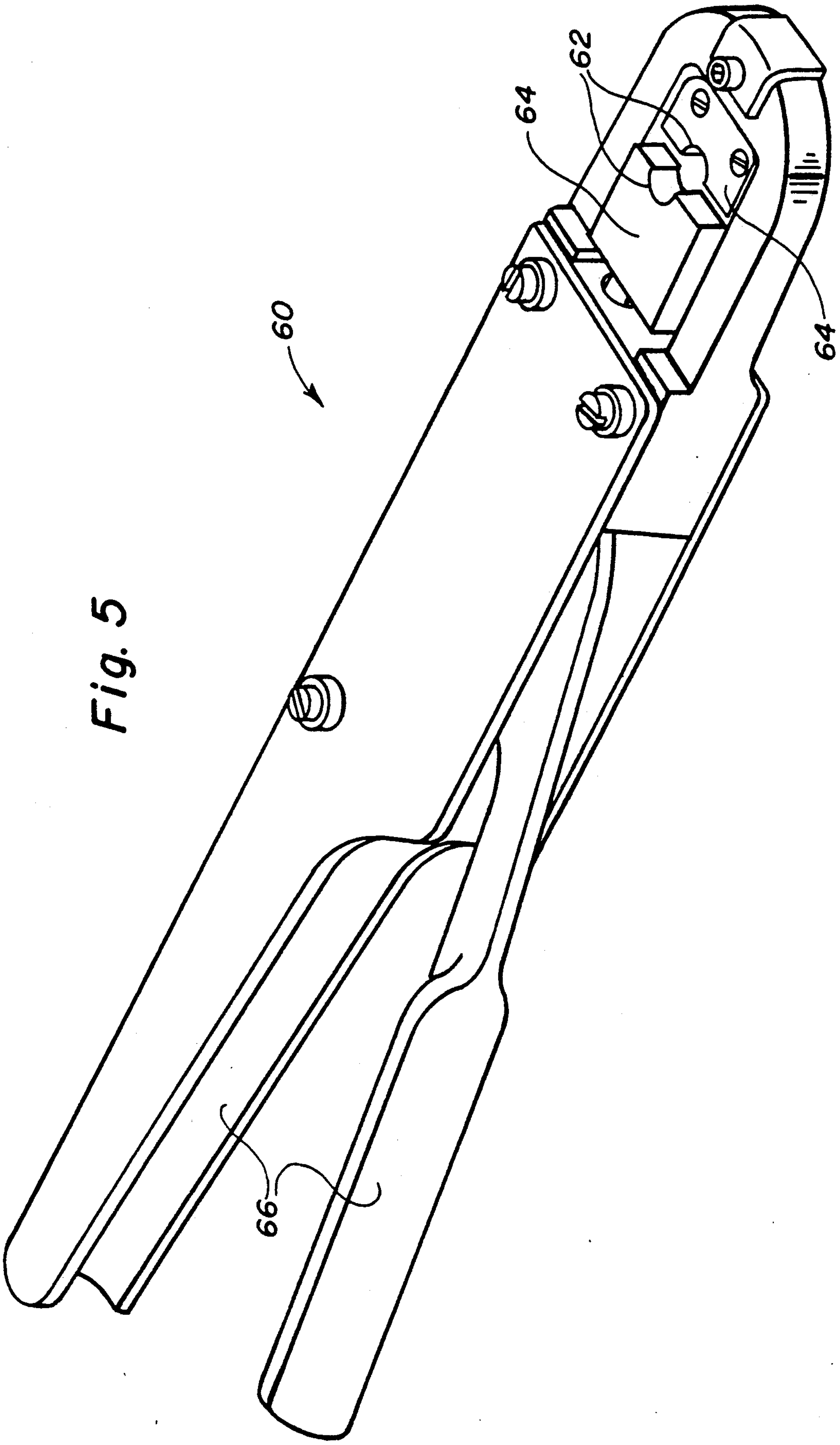
FIG. 5 is a highly stylized perspective representation of a crimping tool adapted for use with the grounding ferrule in accordance with the present invention.

With reference to FIG. 5 shown is a stylized representation of a preferred form of crimping tool 60 suitable for applying the radially inwardly directed crimping force to the ferrule 30 in a circumferentially uniform manner. The tool 60 is generally similar to the hand tools such as that sold by the Interconnect and Packing System Division of E. I. du Pont de Nemours and Company as HT-42, HT-43 or HT-30. The tool 60 shown in FIG. 5 differs from that indentified in the provision of a generally semi-circular of hemipherical opening 62 provided in the jaws 64 thereof. The ferrule 30 is received between the jaws 64 and the handles 66 of the tool 60 operated to close the jaws 64. The closure of the jaws 64 imposes the crimping force on the ferrule 30. Since, in FIG. 5, the jaws 62 each have a generally circular opening formed therein, the constricted ferrule has a generally circular cross section, as is diagrammatically illustrated in FIG. 4. Of course, the opening 62 of the jaws 64 may be of any other convenient shape, and any other convenient form of crimping device may be used to impose the radially directed crimping force to the ferrule 30.

Although the foregoing description has been cast in terms of the individual braided cables being disposed within a master cable, it should be understood that the individual braided cables need not necessarily be so arranged. The ferrule of the present invention may thus be used to electrically interconnect the metallic braids of a group of individual braided cables, without the same being formed into a master cable.

Those skilled in the art having the benefit of the teachings of the present invention as hereinabove set forth may effect numerous modifications thereto. It is to be understood, however, that such modifications lie within the contemplation of the present invention as defined by the appended claims.

What is claimed is:

1. A grounding ferrule for connecting in common the shields of a plurality of cables, the ferrule comprising:
   a generally cylindrical hollow conductive member having a substantially constant wall thickness throughout its axial length, the member having a first and a second axial end thereon with a bore of a predetermined diameter extending therethrough, the bore being sized such that the conductive member is able to recieve and to surround all of the cables being connected, at least three equiangularly circumferentially spaced axially extending slots provided therein, the slots extending for generally the same axial distance intermediate the first and second axial ends of the ferrule thereby to define a plurality of circumferentially adjacent webs, each of the webs having an inner surface thereon, at least one radially inwardly extendly protrusion being disposed on the inner surface of each web. the ferrule being able to respond to a radially inwardly directed crimping force applied circumferentially to the exterior surface of the webs by deflecting radially inwardly to define a constricted central region having a diameter less than the diameter of the member in the uncrimped state, in the crimped state the protrusions on the inner surface of each web being disposed in electrically conducting contact with the sheilds of some of the cables surrounded by the hollow conductive member.

* * * * *